128,371

UNITED STATES PATENT OFFICE.

JULIUS E. DOTCH, OF WASHINGTON, DISTRICT OF COLUMBIA, AND OSCAR LOEW, OF NEW YORK, N. Y.

IMPROVEMENT IN THE MODES OF PRESERVING MEATS.

Specification forming part of Letters Patent No. 128,371, dated June 25, 1872; antedated June 12, 1872.

*To all whom it may concern:*

Be it known that we, JULIUS EDMUND DOTCH, of Washington, District of Columbia, and OSCAR LOEW, of the city of New York, State of New York, have invented a new Method of Preserving Meats, Poultry, Fish, Oysters, and all other animal and vegetable substances; and we do hereby declare that the following is a full and exact description thereof.

The nature of our invention consists in using chloroform, ether—such as acetic or formic, &c.—chloride of ethyl, or related combinations, for the purpose of preserving meats, poultry, fish, oysters, and all other animal substances. It is known that chloroform, &c., evaporates very quick in the open air, leaving no trace or smell behind; therefore meat thus preserved will, after exposure to the air, lose all the chloroform contained on the surface. Chloroform will not allow at all any fungoid growth, killing those fungi instantly which are the first starting point of putrefaction and the decay of meat. Thus the meat remains entirely untouched by putrefying influences; and on the other hand, chloroform will not at all effect any chemical alteration of the original nature of the meat. The seventy-five per cent. of water contained in the meat will not at all allow any entrance of the chloroform into the interior of the meat. The meat exposed to the air loses, as above stated, every particle of the preservative. Chloroform and ether can be still quicker removed.

In preserving meats according to this system, our mode of operation is as follows: After the meat is butchered, the carcass is cut into pieces of a size convenient for shipping, and placed in air-tight vessels. Into these vessels is then poured a small quantity of chloroform, which becomes vaporized, and thus surrounds the meats with an atmosphere of vapor, which acts as a preservative. The cans are then sealed and are ready for transportation.

When the meat is so preserved in large quantities, previous to preparations for shipping it is placed in closed rooms or refrigerators, into which are introduced the vapors of chloroform.

When the meat is removed from the vessel in which it was preserved by a small quantity of those substances, it is placed in an exhauster, and, by means of an air-pump, all the preserving material is extracted in a few minutes, and again condensed in an unchanged condition.

What we claim as our invention, and desire to secure by Letters Patent, is—

The process of preserving meats, poultry, fish, oysters, eggs, and all other animal substances, by the use of chloroform, ether, chloride of ethyl, or related combinations.

JULIUS EDMUND DOTCH.
OSCAR LOEW.

Witnesses:
W. COAD MILBURN,
JNO. T. PICKETT.